United States Patent Office 3,822,238
Patented July 2, 1974

---

3,822,238
HYDROPHILIC POLYURETHANE POLYMERS
Edgar Allan Blair, Princeton, and Donald Edward Hudgin, Princeton Junction, N.J., assignors to Princeton Polymer Laboratories, Inc., Plainsboro, N.J.
No Drawing. Filed Aug. 2, 1972, Ser. No. 277,361
Int. Cl. C08g 22/08, 22/44
U.S. Cl. 260—75 NK          12 Claims

ABSTRACT OF THE DISCLOSURE

Water absorptive polyurethane polymers prepared from resins having a low ratio of carbon to oxygen to nitrogen or having ionic, quaternary ammonium or salt groups in the resin backbone and a low amount of isocyanate. The water absorptivity of the polyurethane polymers is about 10%, preferably above 20%, and these polymers may range to completely gel-like, high water absorptive polymers; these polymers are useful as coatings, membranes, etc.

---

This invention pertains to polyurethane polymers; more particularly, this invention pertains to polymers which absorb water; moreover, this invention pertains to articles of manufacture made therefrom and articles of manufacture from said polymers such as hydrophilic polymers in the form of films, sheets, various shapes, coatings and carriers.

CROSS REFERENCE TO RELATED APPLICATIONS

In a companion application entitled Water Absorptive Polyurethane Polymers, Ser. No. 265,541, filed June 23, 1972, polyurethane polymers which are rigid, machinable and polishable in the dry state have been disclosed. These polymers are highly hydrophilic and are useful for numerous applications. The present application represents a further development in said hydrophilic polyurethane polymer art, but the diversity of the polymers and the diverse properties of the present polymers make these polymers even more widely useful.

BACKGROUND OF INVENTION

Within the last few decades, the art pertaining to polyurethane chemistry has seen a tremendous growth. As a result, polyurethane polymers of various kinds and forms are fairly well known. In general terms the polyurethanes comprise polymers formed from a resin which has an active hydrogen atom and a polyisocyanate, such as a diisocyanate. Numerous resin systems now exist which have been combined in various ratios with the polyisocyanates, and the end polymers have ranged from rigid castable shapes to soft foams. Various polymer and prepolymer reactions for preparing the above types of polyurethanes have also been developed, and these reactions are fairly well explored.

Of the many resin systems which are known and the properties of which have been described, there are continuously being added new resin systems which in combination with the polyisocyanate overcome some vexing problems encountered with other resin systems or provide better properties for a particular end use. However, many of these resin system *a priori* do not predictably function in a given polymer system; and hence, the empirical observations still are at the foundation for the development of new resin systems as well as discovery of new polymers.

In addition, the various isocyanates which have been available (or proposed to be useful without being available) give different properties in any given resin system as well as give different properties from resin system to resin system. Hence, the predictability of an end polymer properties cannot be inferred from a behavior of the resin system nor the behavior of this resin system in combination of isocyanate, except in very general terms. For this reason the proper combination of the particular resin system with the proper isocyanate and the proper interaction or intercombination with each other is still an empirical art with unpredictable end results.

PRIOR ART

Numerous publications exist in the polyurethane polymer art including surveys of the prior art such as J. H. Saunders et al., *Polyurethanes, Chemistry and Technology*, Part I Chemistry, Interscience Publishers (1962). This book summarizes in part the existing prior art. A great number of publications subsequent to the date of the publication of this book including patent literature have also appeared both in this country and abroad. These publications are too numerous to mention; but in some respect or another, these have some additional illustrations of the various polyurethane precursor resins, the isocyanates, the method of employing or making the same.

As it is well appreciated by those skilled in the art, the issued patents in this art are too numerous to list. Inasmuch as there is disclosed in these patents in some way or another a resin system, an isocyanate, and a polymer because of the common nature of the polyurethane polymer, these patents are all illustrative of polyurethane polymers as such. However, differences in the various polymers associated with resin systems or isocyanates, the proportions of each, linearity and branching of resin chains and functionality of isocyanates, which are often thought to be obvious to the uninitiated, are far more complex and subtle and often represent painstaking investigation of critical parameters and variables. If hydrophilicity or water aborption has been sought for polyurethane polymers, it has more generally been sought for polymers from which foams are formed which are useful as sponges. In general, the hydrophilic polymers have been rather soft and/or non-durable.

In respect to the present invention, the prior art which pertains to the same is most closely related to producing shapes, films, sheets and coatings which are strong and desirably non-variant in properties in either dry or wet state. However, whereas the prior art as a desideratum has striven to form strongly hydrophobic systems for the reason that the strongly hydrophobic polymers display low, if any, dimensional variation in the polymer, the present invention is directed to a combination of properties, i.e. high hydrophilicity, excellent polymer properties in the wet state, and variations from dry to wet state which are tolerably uniform.

Of the more prevalent resin systems for producing soft hydrophilic polyurethanes, the polyethylene glycol and polyalkylene amine resin systems are known; the last two resin systems—in distinction from the polypropylene glycol resin systems which are generally hydrophobic—are used for this purpose. Further, the combination of the polyethylene glycol and polypropylene glycol resins with an appropriate, i.e. far in excess of stoichiometric requirements of isocyanate, have been used to achieve sufficient softness and at the same time sufficient hydrophobicity so that the end product would have the desirable properties. Predominantly, aromatic polyisocyanates such as toluene diisocyanate have been used as the isocyanates.

In reference to the isocyanates which have been employed in combination with the above described resins, conventional aromatic isocyanates, when reacted with the various resins, display properties which are often unacceptable for a number of reasons.

Although the unacceptable properties can be tolerated in a number of products, in other products the use of aromatic diisocyanates have been found to be acceptable as a result of price, availability, and well researched and known properties despite the instability and/or degradation of the aromatic diisocyanate in the polyurethane end polymer.

THE INVENTION

A number of polyurethane polymers have now been discovered and invented which have the desired properties of softness and when exposed to humid atmosphere or when wet, have excellent properties in the wet state. These polymers, when in the wet state, range from gel-like polymers to polymers being compliant, soft and flexible; and in the dry state, from gel-like polymers to polymers which are machinable and polishable. Besides numerous other beneficial properties and uses, these polymers are suitable as coatings, linings, membranes (dialysis or osmosis), absorbents, controlled release agents, swellable fabrics, gauzes, solubilizing packaging components, water transmitting coated fabrics, water swelling caulks, wet friction elastomers, artificial leather, gas filters, dentures, hair sprays, nail polishes, oil resistant shapes, etc. As coatings, the present polymers suggest themselves to the following uses: as washable surface coatings; marine paint, e.g. friction reduction coatings, antifouling agent carriers and release paints either controlled release or controlled leaching or both; antifog coatings, e.g. in diving goggles, antistatic agents; friction reducing coatings for pipes such as used for irrigation or firefighting; and shapes, either cast or machinable useful as body implants. These polyurethane polymers are derived from a unique combination of a proper resin and a proper isocyanate.

In respect to the novel polyurethane, it is obtained by employing a proper —OH group terminated resin derived either from ethers, esters, ether-ester block-containing resin, or resin chains modified by various pendant, introduced, or converted groups attached to said resin chain.

For sake of easy understanding, the resin systems are based on the tabulated grouping of resins and mixtures of same.

In general, the lower alkyl compounds of the alkyl halides, sulfates, etc., are preferred.

Additional resins useful for the present purposes are: sulfonated maleic, itaconic, fumaric, mesaconic, citraconic esters wherein the dihydroxy precursor of said ester is preferably 2 to 4 carbon atoms, generally up to 12 carbon atoms may be in the chain of said precursor. The double bond of the unsaturated compounds after the formation of said ester is sulfonated in a manner well known to those skilled in the art. In respect to the above amine salt, quaternary ammonia salt and sulfonate groups, the ratio of one ionic group to twenty carbon atoms furnishes sufficient water absorption to the polymer; lower ratios will provide increased water absorption to the polymer. As a convenient lower limit, one ionic group per 6 carbon atoms is illustrative.

Still other useful resins are derived from methyl-diethanol amine, belonging to the group of alkyl dialkanol amines such as lower alkyl lower dialkanol amines, and a diacid. A resin falling within this group is methyl diethanol amine adipate or resins from the amine and other diacids such as sebacic and azelaic. The amine moiety(s) is quaternized after the resin formation with the same precursors as listed above for quaternary ammonium compounds. Other useful acids for the above resin are maleic acid, phthalic acid, fumaric acid, itaconic acid, mesaconic acid, citraconic acid, etc.

Similarly, a resin derived from polyethylene imine such as polyethylene imine adipate may be useful as it may also be partially quaternized. Acids which may be useful for the formation of these "imine ester" resins are sebacic, azelaic, maleic, phthalic acids, itaconic, mesaconic, and citraconic acids.

In the event the polypropylene imine or polyethylene imine compounds or the same as precursors are used as resins such as containing up to 50 imine units, these may be further modified by adducting the same with ethylene oxide, ethylene glycol, dioxolane or propylene glycol (in respect to the polyethylene imine, polypropylene glycol

TABLE I.—RESINS AND RESIN MIXTURES

| Number of —OH or amine groups contained in a compound | Monomer unit | Resin comonomer amounts tolerable in resin (low content=less than 3 moles of monomer per equivalent of —OH; high content=more than 3 moles of monomer per equivalent of —OH) | | | | |
|---|---|---|---|---|---|---|
| | | Ethylene oxide | Propylene oxide | Ethylene imine | Propylene imine | Dioxolane |
| —OH compounds: | | | | | | |
| 2 | Ethylene glycol | Any | Low | Any | Low | Any. |
| 2 | Propylene glycol | High | None | High | None | High. |
| 3 | Glycerol | Any | Low | Any | Low | Any. |
| 3 | Trimethylol propane | Any | Low | Any | Low | Any. |
| 4 | Erythritol | Any | Low | Any | Low | Any. |
| 4 | Penta erythritol | Any | Low | Any | Low | Any. |
| 5 | Anhydro enneaheptitol | Any | Low | Any | Low | Any. |
| Acids: | | | | | | |
| 3 | Trimellitic acid | High | None | High | None | High. |
| 3 | H₃PO₄ | do | do | do | do | Do. |
| 4 | Pyromellitic acid | do | do | do | do | Do. |
| 6 | Mellitic acid | Any | Very low | Any | Very low | Any. |
| —OH acids: | | | | | | |
| 2 | Malic | Any | Low | Any | Low | Any. |
| 3 | Citric | Any | Low | Any | Low | Any. |
| | Sugar acids | Any | Low | Any | Low | Any. |
| 50 units | Partially saponified polyvinyl acetate | Any, high | None | Any, high | None | High. |
| Do | Polyacrylic acid | do | do | do | do | Do. |
| Amines: | | | | | | |
| 1 | Ammonia | Any | Low | Any | Low | Any. |
| 2 | Ethylene diamine | Any | Low | Any | Low | Any. |
| 2 | Propylene diamine | High | None | High | | Any. |
| 3 | Diethylene triamine | Any | Low | None | Low | High. |
| 4 | Ethylene tetraamine | Any | Low | do | Low | Do. |
| 4 | Hexamethylene diamine | High | None | High | None | Do. |
| 50 units | Polyethylene imine | Any | Low | | Low | Any. |

In addition to the above resins an based on the above resins, the following resins are highly water absorptive:

(a) Amine and polyamine salts and quaternary compounds, wherein the salts are such as chlorides, bromides, iodides, nitrates, sulfates, oxalates, etc.; the quaternary compounds are derived from alkyl halides, benzyl halides, alkyl sulfates, alkylene oxide; and the anion may also be a chlorate, bromate, phosphate, sulfate or nitrate;

(b) Mixed alkoxy amines and polyamines and salts and quaternary compounds thereof of the salts and quaternary compond precursors as recited above.

may be used when ionic group formation is contemplated for the polypropylene imine compounds). Thus hydrogen on the nitrogen atom in the chain may be replaced by the adducting compound. Similarly, the —OH group carrying compounds may be adducted with ethylene imine or propylene imine.

The above resins may also be admixed with polyethylene oxide adipate provided the last named resin has a molecular weight below 1000. The amount which may be incorporated should be less than 50% based on the total weight of the resin.

Still another class of resins which are useful are the sulfhydryl resins in which are introduced the sulfonium, sulfoxide or sulfone groups. Illustrative precursors of these resins are ethylene sulfide and 1,3-propylene sulfide. These resins, after formation of prepolymers with isocyanates (or the final polymers), are then converted by oxidation of the sulfhydryl group(s) to the ionic group containing resins or by alkylation to the sulfonium groups. The sulfonium group substituents are lower alkyl moieties as preferred substituents, and the electronegative element is $Cl^-$, $Br^-$ or $I^-$ or a radical OH. In general the sulfhydryl polymers have molecular weights from 700 to 6000 or are from 10 units to 100 units of the monomer precursor in the chain. Again, these resins should be tractable.

In respect to these resins, the equivalent weight of these is above 140, preferably above 170, i.e. up to 2000. In addition, a ratio of 2.8 carbon atoms to one oxygen atom or one amine nitrogen is still required; the lower ratio is 1.2:1 to 2.8:1 and the preferred ratio is 1.33:1 to 2.8:1. When the above-mentioned ionic groups are present, the ratios of these groups to the carbon atoms in the resin may be, in the resin portion of the final product, as stated previously. For controlling the necessary hydrophilicity, the above resins may be admixed with some more hydrophilic resins or less hydrophilic including hydrophobic resins. The more hydrophobic resins are selected from the herein disclosed resins or resins disclosed in companion application Ser. No. 265,541, filed June 23, 1972 (attorney's docket No. 36,129). The less water absorptive resins are based on comparison to the presently disclosed resins or may be hydrophobic resins which, when admixed with the water absorptive resins, will produce the acceptable water absorption. Water absorption of the polyurethane polymer may also be controlled by the amount of isocyanate which is added to the resin. Greater amounts (compared to a base level) will increase hardness of the resin (more machinable and polishable) and also make the resin less water absorbent.

Water absorption is determined by immersing the polymer in water at 20° C. for 24 hours and weighing the polymer in a dry state and after removal from water and expressing the gain as percent (by weight of polymer) of water absorbed.

Consequently, the disclosed excess of isocyanates, in the range set forth herein, allows the control of hardness and water pickup. In the event of low equivalent weight resins or resins having low ratio of ionic groups to carbon atoms, greater excess of isocyanates may be used as long as the desired water absorption is achieved. Also isocyanates with functionality of greater than two may be used for the above purpose and for the purpose of furnishing thermoset polymers. Difunctional isocyanates and linear difunctional resins, if used in one to one ratio, will produce thermoplastic polymers.

If a resin is used having a functionality greater than two, then the thermoset or thermoplastic nature of the polymer will be determined by the amount of isocyanate. If one isocyanate molecule is used per resin molecule, the resin will be thermoplastic; however, if in excess of one isocyanate molecule is used per resin molecule, the polymer will be thermoset. According to the present invention, water soluble polymers are not desirable; water absorptive polymers are; and the thermoset polymers are preferred.

A listing of the above resin systems or derivatives thereof is set out below for easy visualization of the present invention.

(1) An adduct of dihydroxy compounds such as ethylene glycol or propylene glycol with ethylene oxide, propylene oxide, ethylene imine, propylene imine, dioxolane or mixtures of same;

(2) An adduct of trihydroxy compounds such as glycerol or trimethylol propane with ethylene oxide, propylene oxide, ethylene imine, propylene imine, dioxolane or mixtures of same;

(3) An adduct of tetrahydroxy compounds such as erythritol or pentaerythritol with ethylene oxide, propylene oxide, ethylene imine, propylene imine, dioxolane or mixtures of same;

(4) An adduct of polyhydroxy compounds such as anhydroenneaheptitol, sorbitol, mannitol, hydrolyzed low molecular weight polyvinyl acetate, sucrose or lactose with ethylene oxide, propylene oxide, ethylene imine, propylene imine, dioxolane or mixtures of same;

(5) An adduct of polybasic acids such as trimellitic acid, pyromellitic acid, mellitic acid, pyrophosphoric acid, and low molecular weight polyacrylic and methacrylic acids with ethylene oxide, propylene oxide, ethylene imine, dioxolane or mixtures of same;

(6) An adduct of hydroxy acids such as malic acid, citric acid or sugar acids with ethylene oxide, propylene oxide, ethylene imine, dioxolane or mixtures of same;

(7) An adduct of amino compounds, such as ammonia, ethylene diamine, diethylene triamine, triethylene tetramine with ethylene oxide, propylene oxide, ethylene imine, dioxolane or mixtures of same;

(8) Hydrammonium or quaternary ammonium salts of (7);

(9) A sulfonated polyester rein of maleic acid, itaconic acid, mesaconic acid, fumaric acid and a glycol of 2 to 6 carbon atoms;

(10) A polyester of a lower alkyl dialkanolamine and a diacid wherein the diacid is adipic, sebacic, azelaic, maleic, phthalic, fumaric acid or mixtures of same, the amine group being converted to an hydrammonium or quaternary ammonium group;

(11) A linear or slightly branched polyamide wherein the amine is diethylene triamine, triethylene tetramine, tetraethylene pentamine or other polyloweralkylene imines such as ethylene imine or propylene; and the diacids are maleic, adipic, azelaic, sebacic, phthalic, itaconic acid or mixtures of same (the term "slightly branched" indicates only methyl or ethyl substituents on the backbone, the ethyl substituent being less than 1%);

(12) Hydrammonium or quaternary ammonium salts of (11);

(13) Polysulfhydryl resin having in the backbone sulfonium, sulfoxide, or sulfone groups;

(14) Hydrammonium or quaternary ammonium salts of ethylene or propylene imine adducts of polyhydroxy compounds from categories (1) to (4);

(15) Polyesters of polyethylene oxides with maleic acid, adipic acid, sebacic acid, phthalic acid, azelaic acid, fumaric acid or mixtures of same.

In the event the above resin (in the polymer, when reacted with the proper amount of isocyanate) does not give the defined water absorption, then it is converted to the salt or quaternary ammonium compound if possible; if it is not possible to form a salt of quaternary ammonium compound either in the resin form or in the final polymer, then these resins are unfit as starting resins for the herein claimed polyurethane polymers. Similarly, the resins which display considerable water absorption may be reacted with greater amounts of isocyanate than the less water absorptive resins. In combination with the functionality of the resin and isocyanate, the water absorption of resins and ability to increase or decrease the same, the proper use of the amount of isocyanate, a polyurethane polymer may be tailored to give the necessary water absorption and, in conjunction with water absorption, the properties necessary for satisfying the demands imposed by the environment in which the polyurethane polymer has to function.

In respect to the isocyanates, these may be represented by OCN—R'—NCO wherein R' is aliphatic including alicyclic compounds such as aliphatic, aliphatic-alicyclic, and aliphatic-aromatic hydrocarbon compounds from 4 to 36 carbon atoms, but more conventionally from 6 to 20 and generally from 6 to 13 carbon atoms. Representative examples of the above isocyanates are: tetramethylene diisocyanate; hexamethylene diisocyanate; trimethyl-hexamethylene diisocyanate; dimer acid diisocyanate; isophorone diisocyanate; hydrogenated diphenyl methane diisocyanate; methylene di(cyclohexyl isocyanate); meta-xylylene diisocyanate; diethylbenzene diisocyanate; decamethylene 1,10-diisocyanate; cyclohexylene 1,2-diisocyanate and cyclohexylene 1,4-diisocyanate.

Other compounds which are useful are the isocyanate equivalents which produce the urethane linkages such as the nitrile carbonates, i.e., the adiponitrile carbonate of the formula

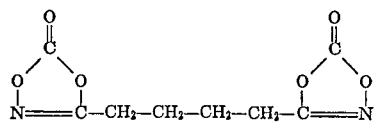

The compound is designated as ADNC and has been found as useful as the preferred isocyanates.

The preferred diisocyanate is the methylene di(cyclohexyl isocyanate) and ADNC. Other but slightly less preferred diisocyanates are trimethyl hexamethylene diisocyanate and isophorone diisocyanate.

Although the aromatic isocyanates such as 2,4 and 2,6 tolylene diisocyanate; 4,4' diphenylmethane diisocyanate; 1,5 naphthalene diisocyanate; dianisidine diisocyanate; tolidine diisocyanate; xenylene diisocyanate; tetrahydronaphthalene-1,5 diisocyanate, etc. are useful for obtaining the polyurethane polymers, and these polymers have the desirable properties, the aromatic isocyanate based polymers are only useful if the degradation or if the stabilizers can be tolerated. Hence, the aromatic isocyanates are vastly less desirable.

A mole to mole ratio of resin and —NCO will produce a water soluble and fusible polymer; hence, the ratio of —NCO to resin molecules should be in about a 10%, even up to 15%, excess above the equimolar ratio. If the isocyanate is used in greater excess for the same resin, water pickup of the polymer will decrease. However, some resins (high equivalent weight) will tolerate considerable increase of the isocyanate above the equimolar ratio, even as high as equal equivalents. Additionally, a prepolymer may be reacted with the resin in addition to the isocyanate such as a polyethylene oxide and isocyanate prepolymer. However, the minimum water absorption of the end polymer should be at least 10%. The ethylene oxide may be up to 100 units in the prepolymer; a prepolymer of 4 ethylene oxide units is a convenient lower range for the prepolymer, although the lowest unit may be ethylene glycol as a derivative of ethylene oxide. The polyol may be as low as 10% by weight when a prepolymer is used and as high as 40% by weight based on the total weight of polyol and prepolymer.

In reacting the resin with the isocyanate, either a one-shot or a prepolymer reaction procedure may be followed. The reaction is carried out by heating the reactants for the appropriate length of time; the reaction may also be accelerated or controlled by appropriate catalysts such as stannous octoate, dibutyl tin salts, DABCO, or other tertiary amines or compounds recognized as catalysts for urethane reactions and well known in the art. The polymer may be prepared in bulk, in solution or in suspension.

For purposes of the present invention, the resin system is a tractable, i.e. a workable, resin system for a reaction with the isocyanates. A workable resin system is one which is formed of the resin and a solvent or a resin which is liquid or can be liquified at a reasonable working temperature, e.g. up to 100° C. A preferred solvent is dimethylformamide, dioxane or butyrolactone.

In placing the present invention in its proper context, while it is known that the prior art polyurethanes which are derived from a so-called "soft" resin can be hardened by using increased amounts of isocyanate, with the concomitant decrease in hydrophilicity, the present invention has been achieved by using a proper and low ratio of isocyanate to resin ratio. The observed phenomenon of the increase in hardness and concomitant hydrophobicity of the polymer by increase of isocyanate to resin ratio has been counteracted in the present invention, in distinction from the prior art, by the proper incorporation of the water absorptive moieties in the resin, proper selection of molecular weights, equivalent weights, and the discovery of the proper chemical structure of the polymer with the novel end result being a polymer having great increase in water pickup and at the same time the desired physical properties.

As a consequence, the presently discovered polyurethanes have answered the desired need for a polymer which has the parameters acceptable for manufacturing articles of commerce such as listed above under the conditions of the present day technology.

In illustrating the above polymers which are useful for the enumerated application, the so-called Hydron (trademark of National Patent Development Corporation, New York, N.Y.), a hydrophilic acrylic resin base polymer, is a convenient benchmark. The properties of the present polymers compare favorably with the Hydron polymers. These properties will now be further amplified. In general the polymer may have a water pickup in excess of 10%, preferably in excess of 20%. A polymer having a 20% water pickup is preferred because at or above this degree of water absorption the polymer may be usefully employed to simulate the many natural polymers or membranes existing in plants or living beings. Generally a water absorption of 37% or more by weight is rather easily achieved, and up to 200% water pickup may be achieved. The polymer may be cast or shaped by techniques well known in the art such as used for films, sheets, deposits, extrusions, pressure casting, etc. For appropriate marine coatings which have have a base polymer such as in Example 19 and which may be active agent leaching coatings, the disclosure in U.S. Pat. 3,575;123 is explanatory of the uses for which the present polymers are suitable. However, the present polymers are far more durable and versatile and can be tailored to meet specific design goals.

In furnishing an illustrative embodiment of the present invention, the following examples not only illustrate but also amplify the above described invention; however, the examples herein are for the purpose of illustrating the invention which invention is to be viewed from all the present disclosure and not merely from the examples.

EXAMPLE 2

Resin 1.—62 grams (1 mole) of ethylene glycol were placed in a flask with a gas inlet and stirrer. The ethylene glycol was heated at 110° C. and a vacuum of about 10 mm. Hg was applied to it to dry it thoroughly. 0.5 gram solid NaOH was added and the mixture was stirred until the NaOH dissolved. 632 grams (9 moles) of propylene oxide were distilled into the reactor through the gas inlet at such a rate that the pressure in the reactor remained constant at 1 atmosphere. When all of the propylene oxide had been added, $CO_2$ gas from Dry Ice was added to neutralize the NaOH. The resulting resin has a molecular weight of 694 and a C:O ratio of 2.63:1.

Polymer 1.—69.4 grams (0.1 mole) of Resin 1 were reacted with 28.8 grams (0.11 mole) of Hylene W (a light stable diisocyanate having an equivalent weight of 131, produced by Du Pont) by heating the two together for 48 hours at 110° C. The product was a soft resin which swelled slightly in water.

EXAMPLE 2

Resin 2.—124 grams (2 moles) of ethylene glycol where dried by storing over 4A molecular sieve. 0.01 gram boron trifluoride etherate was added and the temperature was raised to 55° C. 592 grams (8 moles) of dioxolane were added dropwise at a rate such that the temperature did not exceed 60° C. The reaction mixture was maintained at 55° C. overnight, yielding an oily liquid having a molecular weight of 310 and a C:O ratio of 1.4:1.

Polymer 2.—31 grams (0.1 mole) of Resin 2 were reacted with 23.1 grams (0.11 mole) trimethyl hexamethylene diisocyanate by heating for 8 hours in the presence of 0.01 gram stannous octoate, yielding a rubbery polymer which swelled greatly when immersed in water.

EXAMPLE 3

Resin 3.—The procedure for Resin 1 was repeated with 62 grams (0.67 mole) glycerol and 632 grams (9 moles) of propylene oxide, yielding an oily resin with a molecular weight of 1035 and a C:O ratio of 2.62:1.

Polymer 3.—103 grams (0.1 mole) of Resin 3 were reacted with 28.8 grams (0.11 mole) of Hylene W by the procedure disclosed for making Polymer 1 (above), yielding a rubbery polymer which absorbs more water than Polymer 1.

EXAMPLE 4

Resin 4.—The procedure for making Resin 2 was repeated with 92 grams (1 mole) of glycerol and 222 grams (3 moles) of dioxolane, yielding a resin with a molecular weight of 314 and a C:O ratio of 1.33:1.

Polymer 4.—31.4 grams (0.1 mole) of Resin 4 were reacted with 282 grams (0.11 mole) of Hylene W according to the procedure for preparing Polymer 1. This polymer is hard and resinous and absorbs water and softens to a rubbery state in water.

EXAMPLE 5

Resin 5.—45 grams (0.33 mole) of trimethylol propane were reacted with 955 grams (13 moles) of dioxolane according to the procedure for preparing Resin 2, yielding a waxy resin having a molecular weight of 3000 and a C:O ratio of 1.52:1.

Polymer 5.—100 grams (0.1 equivalent, 0.33 mole) of Resin 5 were reacted with 10.5 grams (0.1 equivalent, 0.05 mole) of trimethyl hexamethylene diisocyanate by dissolving the resin and isocyanate in 250 grams dry dimethyl formamide and heating at 110° C. for 48 hours. The product was an elastic gel. The dimethyl formamide was leached out of the polymer with water, leaving a soft, rubbery gel containing about 70% water. On drying, a strong, soft rubbery polymer remained.

EXAMPLE 6

Resin 6.—122 grams (1 mole) of erythritol were reacted with 464 grams (8 moles) of propylene oxide according to the procedure for making Resin 1, giving a product with a molecular weight of 586 and a C:O ratio of 2.33:1.

Polymer 6.—58.6 grams (0.1 mole) of Resin 6 were reacted with 28.8 grams (0.11 mole) Hylene W according to the procedure for making Polymer 1. The product was a hard resinous solid which softened in water and swelled.

EXAMPLE 7

Resin 7.—250 grams (1 mole) of pyromellitic acid were dispersed in 222 grams of dry dimethyl formamide. 0.25 gram of NaOH was added and the temperature was raised to 110° C. 528 grams (12 moles) of ethylene oxide were distilled into the reactor, yielding a resin having a molecular weight of 778 and a C:O ratio of 1.4:1. This resin is stored as a 77.8% (1 molar) solution in DMF.

Polymer 7.—100 grams of Resin 7 solution, containing 77.8 grams (0.1 mole) of Resin 7, were reacted with 23.1 grams (0.11 mole) of trimethyl hexamethylene diisocyanate by the method disclosed for preparing Polymer 5. After leaching the DMF out and drying, the polymer was strong and hard, but softened and swelled in water.

EXAMPLE 8

Resin 8.—192 grams (1 mole) of citric acid were reacted with 155° C. with 3080 grams (86 moles) of ethylene oxide according to the procedure for making Resin 1. The resin formed was a waxy solid having a molecular weight of 4000 and a C:O ratio slightly below 2:1.

Polymer 8.—100 grams (0.025 mole, 0.1 equivalent) of Resin 8 were reacted with 13.1 grams (0.05 mole, 0.1 equivalent) of Hylene W according to the procedure for preparing Polymer 5. The properties of the polymer were similar to Polymer 5.

EXAMPLE 9

Resin 9.—360 grams (0.1 mole, 5 equivalents) of a polyacrylic acid with a 50 degree of polymerization were dissolved in 420 grams of dimethyl formamide. 220 grams (5.0 moles) of ethylene oxide were added according to the method for preparing Resin 7, yielding a resin with a molecular weight of 5800 and a C:O ratio of 1.67:1, as a 0.1 molar solution in DMF.

Polymer 9.—100 grams (containing 58 grams, 0.01 mole) of Resin 9 solution were reacted with 2.88 grams (0.11 mole) of Hylene W according to the procedure disclosed for preparing Polymer 5. The polymer thus formed was hard and resinous, but swelled and absorbed several times its weight in water after being worked up the same as Polymer 5.

EXAMPLE 10

Polymer 10.—Polymer 9 synthesis was repeated using 21.0 grams (0.10 mole) of trimethyl hexamethylene diisocyanate in place of the Hylene W. The polymer was harder and absorbed less water than Polymer 9.

EXAMPLE 11

Resin 10.—136 grams (1 mole) of triethylene tetramine were reacted with 264 grams (6 moles) of ethylene oxide by distilling the ethylene oxide into the triethylene tetramine at 80° C. The resulting product was a viscous liquid resin having a molecular weight of 300 and a C:(O+N) ratio of 1.8:1.

Polymer 11.—30 grams (0.1 mole) of Resin 10 were reacted with 28.8 grams (0.11 mole) of Hylene W according to the method disclosed for preparing Polymer 1. The polymer was hard and resinous, but softened in water.

EXAMPLE 12

Resin 11.—30 grams (0.1 mole, 0.6 equivalents) of Resin 10 were reacted with 570 grams (13 moles) of ethylene oxide according to the method for preparing Resin 1, yielding a waxy resin with a molecular weight of 6000 and a C:(O+N) ratio of slightly less than 2:1.

Polymer 12.—100 grams (0.017 mole, 0.1 equivalent) of Resin 11 were dissolved in 100 grams of dimethyl formamide and was reacted with 8.7 grams (0.1 equivalent) of toluene diisocyanate, forming a polymer which was soft and rubbery after removal of the dimethyl formamide. The polymer swelled to several times its starting volume when immersed in water.

EXAMPLE 13

Polymer 13.—58.8 grams (0.1 mole) of Polymer 11 (containing 0.4 moles amine nitrogen) were heated for 24 hours at 100° C. with 24.6 grams (0.2 mole) of benzyl chloride. The product thus obtained swelled more in water than did Polymer 11.

EXAMPLE 14

Polymer 14.—30 grams (0.1 mole) of Resin 10 were dissolved in 50 grams dimethyl formamide. 20.5 grams (0.09 mole) adiponitrile dicarbonate was added and the solution was heated at 110° C. until the evolution of carbon dioxide stopped. The resulting viscous solution, containing a polymer with a calculated molecular weight of about 5000 was reacted with 4.2 grams (0.02 mole) of trimethyl hexamethylene diisocyanate. The polymer, after removal of the dimethyl formamide and drying, was hard and resinous, but swelled in water.

EXAMPLE 15

Resin 12.—A polyester resin was prepared by reacting 588 grams (6 moles) of maleic anhydride, 875 grams (6 moles) of adipic acid, and 807 grams (13 moles) of ethylene glycol at 200° C. with a nitrogen purge to remove water. The resulting polyester had a molecular weight of 2162 and a hydroxyl equivalent weight of 1081. It has a double bond equivalent weight of 360.

Polymer 15.—21.6 grams (0.01 mole) of Resin 12 were reacted with 5.0 grams (0.020 mole) methylene diphenyl isocyanate by heating the two together at 30° C. for 8 hours, forming an isocyanate terminated prepolymer. The prepolymer was cast in a thin film and allowed to cure by reaction with atmospheric moisture. The polymer film was a firm elastomer. The cured film was boiled with a 10% aqueous solution of sodium bisulfite for 45 minutes, during which time the film expanded in area. The film shrank and became hard and brittle when dried, but softened and swelled in water.

EXAMPLE 16

Resin 13.—1260 grams (8.6 moles) of adipic acid and 1140 grams (9.6 moles) of methyl diethanolamine were reacted at 200° C. to form a tertiary amine containing polyester resin with a molecular weight of 2090, a hydroxyl equivalent weight of 1045, and an amine equivalent weight of 243.

Polymer 16.—104.5 grams (0.1 equivalent, 0.05 mole) of Resin 13 was reacted with 9.6 grams (0.11 equivalent, 0.0505 mole) toluene diisocyanate and 54 grams benzyl chloride by heating the mixture at 110° C. for 8 hours. The polymer thus obtained was hard and brittle, but swelled to form a soft gel in water.

EXAMPLE 17

Resin 14.—136 grams (1 mole) of triethylene tetramine were reacted with 146 grams (1 mole) of adipic acid by heating at 200° C. until the reaction mixture reached a viscosity of about 200 cps. at the reaction temperature. On cooling, the resin solidified to a glassy mass. The molecular weight was not measured, but is estimated to be 10,000. The C:(N+O) ratio is 2:1 and the amine equivalent weight is 128.

Polymer 17.—100 grams (about 0.01 mole, 0.77 equivalents NH) of Resin 14 were reacted with 15.1 grams (0.06 moles) of Hylene W vy heating the mixture for 8 hours at 110° C. The polymer, which is rubbery, swells slightly in water. When acid is added to the water, the polymer forms an amine salt which swells much more and absorbs more water. On drying, the same salt of the polymer is hard and brittle.

EXAMPLE 18

Resin 15.—182 grams (1 mole) of sorbitol were reacted with 696 grams (12 moles) of propylene oxide according to the procedure for preparing Resin 1, forming a viscous liquid resin with a molecular weight of 878 and a C:O ratio of 2.3:1.

Polymer 18.—87.8 grams (0.1 mole) of Resin 15 were reacted with 23.1 grams (0.11 mole) of trimethyl hexamethylene diisocyanate according to the procedure disclosed for preparing Polymer 1. The polymer is hard and resinous and swells in water.

EXAMPLE 19

Resin 16.—18.2 grams (0.1 mole) of sorbitol were reacted with 572 grams (13 moles) of ethylene oxide according to the method disclosed for preparing Resin 1, yielding a resin with a molecular weight of 6000 and a C:O ratio slightly less than 2:1. The resin is waxy and melts to a moderately viscous liquid at about 45° C.

Polymer 19.—60 grams (0.01 mole, 0.06 equivalent) of Resin 16 and 10.5 grams (0.06 mole, 0.12 equivalent) toluene diisocyanate were reacted by heating at 80° C. for 4 hours, forming an isocyanate terminated prepolymer. The prepolymer was dissolved in sufficient dry methyl ethyl ketone to obtain a viscosity of 2000 cps. This solution was painted onto a wood surface and allowed to cure by atmospheric moisture. The coating was strong and resilient, and water spread on it.

EXAMPLE 20

Resin 17.—158 grams (1.4 moles) of 1,3 dichloro propane were dissolved in 158 grams of dioxane. A saturated solution of 117 grams (1.5 moles) of $Na_2S$ in water was mixed with the dioxane and the liquids were boiled together for 4 hours. The polymeric product, after washing with HCl had a molecular weight of 1030 and a C:S ratio of 3:1. It is a SH terminated polythioether.

Polymer 20.—10.3 grams (0.01 mole) of Resin 17 was mixed with 1.94 grams (0.01 mole) of toluene diisocyanate and the mixture was cast into a thin film and allowed to cure at 100° C. for 8 hours. The cured film, which was rubbery, was immersed for one half hour in 3% hydrogen peroxide solution. The polymer film swelled. The oxidized film, which contains sulfone groups, shrinks and becomes hard on drying, but swells and softens in water.

EXAMPLE 21

Resin 18.—122 grams (1 mole) of erithrytol were reacted with 516 grams (12 moles) of ethylene imine according to the method disclosed for preparation of Resin 2, forming a resin having a molecular weight of 638 and a C:(O+N) ratio of 1.75:1.

Polymer 21.—63.8 grams (0.1 mole) of Resin 18 were reacted with 28.8 grams (0.11 mole) of Hylene W by mixing the two at room temperature and gently warming until the mixture became clear. The polymer is hard and resinous in the dry state and swells and softens in water. When the water is acidified, the polymer swells further.

EXAMPLE 22

Resin 19.—182 grams (1.0 mole) of sorbitol was reacted with 342 grams (6 moles) propylene imine according to the method disclosed for preparation of Resin 2. The product was a viscous liquid with a molecular weight of 542 and a C:(O+N) ratio of 2:1.

Polymer 22.—54.2 grams (0.1 mole) of Resin 19 were reacted with 28.8 grams (0.11 mole) of Hylene W by the method of Polymer 21. The properties of the polymer are similar to those of Polymer 22 except that it swells in water to a smaller extent.

EXAMPLE 23

Resin 20.—960 grams (6.6 moles) of adipic acid were reacted with 1475 grams (7.6 moles) of tetraethylene glycol to form a polyester with a molecular weight of 2217 and a C:O ratio of 2:1.

Polymer 23.—222 grams (0.1 mole) of Resin 20 were reacted with 27.5 grams (0.11 mole) of methylene di(phenylisocyanate) by heating at 110° C. for 24 hours. The polymer, which is elastomeric, swells in water and becomes softer.

What is claimed is:
1. A crosslinked polyurethane polymer consisting essentially of
   (A) as a resin precursor of said polyurethane polymer, a polyfunctional resin having an equivalent weight of more than 170 and up to 2000 and a numerical carbon to oxygen or carbon to nitrogen ratio of up to 2.5:1 to 1.2:1 or a numerical carbon to ionic group ratio in said resin of 20:1 to 6:1, said resin being selected from the class consisting of:

(1) an adduct of
   (a) a dihydroxy compound with propylene imine, ethylene oxide, propylene oxide, ethylene imine, dioxolane or mixtures of same;
   (b) a trihydroxy compound with ethylene oxide, propylene oxide, ethylene imine, propylene imine, dioxolane or mixtures of same;
   (c) a tetrahydroxy compound with ethylene oxide, propylene oxide, ethylene imine, propylene imine, dioxolane or mixtures of same;
   (d) a polyhydroxy compound of more than 4-OH groups with ethylene oxide, propylene oxide, ethylene imine, propylene imine, dioxolane or mixtures of same;
   (e) a hydroxy carboxylic acid or a sugar acid with ethylene oxide, propylene oxide, ethylene imine, propylene imine, dioxolane or mixtures of same;
   (f) low molecular weight, hydrolyzed polyvinyl acetate, polyacrylic acid or polymethacrylic acid with ethylene oxide, ethylene imine, dioxolane or mixtures of same;
(2) an adduct of trimellitic acid, orthophosphoric acid, pyromellitic acid, or mellitic acid with ethylene oxide, propylene oxide, ethylene imine, dioxolane or mixtures of same;
(3) an adduct of pyrophosphoric acid with ethylene oxide, propylene oxide, ethylene imine, propylene imine, dioxolane or mixtures of same;
(4) an adduct of ammonia or a polyamino compound with ethylene oxide, propylene oxide, ethylene imine, propylene imine, dioxolane or mixtures of same;
(5) an ammonium or quaternary ammonium salt of said adduct of ammonia or a polyamino compound;
(6) a sulfonated reactive-H group terminated polyester resin of a maleic acid ester, itaconic acid ester, fumaric acid ester, mesaconic acid ester or citraconic acid ester wherein a dihydroxy compound precursor of said ester is a glycol of 2 to 6 carbon atoms;
(7) a reactive-H group terminated polyester amide of a lower alkyl dialkanol amine and a diacid wherein said acid is adipic acid, sebacic acid, azelaic acid, maleic acid, phthalic acid, fumaric acid, itaconic acid, mesaconic acid, citraconic acid, and an ammonium or quaternary ammonium compound of said amine groups;
(8) a reactive-H group terminated linear of slightly branched polyamide wherein the amine precursor of said amide is diethylene triamine, triethylene tetramine, tetraethylene pentamine, a polyloweralkylene imine, and the acid precursor of said amide is adipic, sebacic, maleic, azelaic, phthalic, itaconic, mesaconic, or citraconic, an amine salt or mixtures of same, a hydrammonium quaternary ammonium compound thereof, or an adduct of said amide with ethylene oxide, ethylene glycol, dioxolane or propylene glycol;
(9) a reactive-H group terminated polysulfhydryl resin having in the backbone thereof sulfonium, sulfoxide, or sulfone groups; and
(10) mixtures of above resins;

(B) as a urethane linkage precursor of said polyurethane polymer, an aliphatic, alicyclic-aliphatic, mixed aliphatic-aromatic or an aromatic polyfunctional isocyanate, a nitrile carbonate or mixtures of same of a functionality of 2 or higher in an amount from 0.02 in excess of one equivalent weight of isocyanate times its functionality per equivalent weight of resin times its functionality up to equi-equivalent weight of said isocyanate to said resin.

2. The polyurethane polymer as defined in Claim 1 and wherein the same has a water absorption of above 20%, expressed on basis of the weight of said polymer.

3. The polyurethane polymer according to Claim 1 and wherein said resin is additionally admixed with polyethylene oxide adipate of a molecular weight below 1000.

4. The polyurethane polymer according to Claim 1 and wherein said resin is admixed with a prepolymer of polyethylene oxide and said isocyanate.

5. The polymer as defined in Claim 1 and wherein the isocyanate is selected from the group consisting of tetramethylene diisocyanate; hexamethylene diisocyanate; trimethylhexamethylene diisocyanate; dimer acid diisocyanate; isophorone diisocyanate; hydrogenated diphenyl methane diisocyanate; methylene di(cyclohexyl isocyanate); metaxylylene diisocyanate; diethyl benzene diisocyanate; decamethylene 1,10-diisocyanate; cyclohexylene 1,2-diisocyanate and cyclohexylene 1,4-diisocyanate.

6. The polymer as defined in Claim 1 and wherein the isocyanate is selected from the group consisting of 2,4- and 2,6-tolylene diisocyanate; 4,4'-diphenyl methane diisocyanate; dianisidine diisocyanate; tolidine diisocyanate; xenylene diisocyanate; 1,5-naphthalene diisocyanate; and tetrahydro naphthalene-1,5-diisocyanate.

7. The polymer as defined in Claim 1 and wherein the urethane linkage precursor is adiponitrile carbonate.

8. A polyurethane polymer as defined in Claim 1 and wherein the resin is a hydrammonium or quaternary ammonium salt of ethylene or propylene imine adducts of polyhydroxy compounds wherein the polyhydroxy compound is ethylene glycol, propylene glycol, glycerol, trimethylol propane, erythritol, pentaerythritol, anhydroenneaheptitol, sorbitol, mannitol, hydrolyzed low molecular weight polyvinyl acetate, sucrose or lactose.

9. The crosslinked polyurethane polymer as defined in Claim 1 and wherein the resin is a resin having a carbon to oxygen or amino nitrogen ratio of 2.5 to 1 to 1.2 to 1 of an equivalent weight of more than 170 and up to 2000.

10. The crosslinked polyurethane polymer as defined in Claim 1 and wherein the isocyanate is in an amount from 0.02 to 0.15 in excess of the equimolar ratio in reference to the equimolar amount of said isocyanate.

11. The crosslinked polyurethane polymer as defined in Claim 5 and wherein the isocyanate to resin is in an amount from 0.02 to 0.15 in excess of the equimolar ratio in reference to the equimolar amount of said isocyanate to said resin.

12. The crosslinked polyurethane polymer as defined in Claim 11 and wherein the defined ratio of isocyanate to resin is 0.02 to 0.1.

References Cited

UNITED STATES PATENTS

| | | | |
|---|---|---|---|
| 3,336,242 | 8/1967 | Hampson et al. | 260—2.5 |
| 3,355,437 | 11/1967 | Tesor. | |
| 3,369,060 | 2/1968 | Pelletier et al. | 260—933 |
| 3,382,090 | 5/1968 | Meisel et al. | 117—47 |
| 3,391,196 | 7/1968 | Earing et al. | |
| 3,400,107 | 9/1968 | Black et al. | 260—80 |
| 3,405,162 | 10/1968 | Kuryla | 260—465.6 |
| 3,412,054 | 11/1968 | Milligan | 260—18 |
| 3,419,642 | 12/1968 | McGary et al. | 260—952 |
| 3,507,900 | 4/1970 | Burk et al. | 260—453 |
| 3,661,860 | 5/1972 | Schwarz. | |
| 2,920,983 | 1/1960 | Bugosh. | |
| 2,948,691 | 8/1960 | Windemuth et al. | |
| 3,011,997 | 12/1961 | DeWitt | 260—42 |
| 3,016,404 | 1/1962 | Beauchamp et al. | 260—615 |

(Other references on following page)

UNITED STATES PATENTS

| | | | |
|---|---|---|---|
| 3,094,495 | 6/1963 | Gemeinhardt | 260—2.5 |
| 3,098,048 | 7/1963 | Shelansk et al. | 260—2.5 |
| 3,164,565 | 1/1965 | Calamari. | |
| 3,169,119 | 2/1965 | Dankert et al. | 260—2.5 |
| 3,225,013 | 12/1965 | Fram. | |
| 3,328,321 | 6/1967 | Wismer. | |
| 3,331,791 | 7/1967 | Cuscurida | 260—2.5 |

FOREIGN PATENTS

| | | |
|---|---|---|
| 1,169,929 | 11/1969 | Great Britain. |
| 6716303 | 6/1968 | Netherlands. |
| 268,696 | 2/1969 | Austria. |
| 417,084 | 1/1967 | Switzerland. |
| 759,519 | 5/1967 | Canada. |
| 1,001,912 | 8/1965 | Great Britain. |
| 1,043,509 | 9/1966 | Great Britain. |
| 1,166,289 | 10/1969 | Great Britain. |

OTHER REFERENCES

D.A.S. 1,168,070, April 1964.
D.A.S. 1,808,874, July 1969.

HERBERT S. COCKERAM, Primary Examiner

U.S. Cl. X.R.

3—1; 32—2; 106—13; 117—161, 165; 260—2 EN, 2.5 AD, 75 NQ, 77.5 R, 77.5 AP, 77.5 AQ, 77.5 AR, 77.5 AS, 858, Dig. 17, Dig. 18, Dig. 36